Oct. 26, 1954   W. ASH   2,692,923
FLOAT OPERATED SWITCH AND FLUID DISPENSING CONDUIT
Filed May 4, 1950

William Ash
INVENTOR.

BY *Clarence A. O'Brien*
*and Harvey B. Jacobson*
Attorneys

Patented Oct. 26, 1954

2,692,923

UNITED STATES PATENT OFFICE 2,692,923

FLOAT OPERATED SWITCH AND FLUID DISPENSING CONDUIT

William Ash, Anaconda, Mont.

Application May 4, 1950, Serial No. 160,079

1 Claim. (Cl. 200—84)

This invention relates to an automatic control device for a milk bottle filler which employs the use of a float for controlling the flow of milk from a pump actuated supply system so as to insure an even and readily controlled rate of flow of milk to the bottle filler.

An object of this invention is to provide a milk level control device for a milk bottle filler that will enable the bottle filler to be filled without the milk foaming, and which will substantially prevent spilling due to the fact that the flow of milk is started and stopped at the pump.

A further object of this invention is to provide a stainless steel milk bottle filler which employs a float for actuating a fluid conductor switch, such as a mercury switch, which controls the flow of current to an electrically actuated pump for supplying through the feed system, including a cooler, a supply of milk to the milk bottle cooler, dependent upon the amount of milk in the bottle filler.

Still further objects of the invention reside in the provision of a control device for a milk bottle filler that is strong, durable, highly efficient in operation, simple in construction and manufacture, highly sanitary, and which is both convenient to use and relatively inexpensive.

These, together with the various ancillary objects of the invention which will become apparent as the following description proceeds, are attained by this automatic milk level control for bottle filler, a preferred embodiment of which has been illustrated in the accompanying drawings, by way of example only, wherein.

Figure 1:
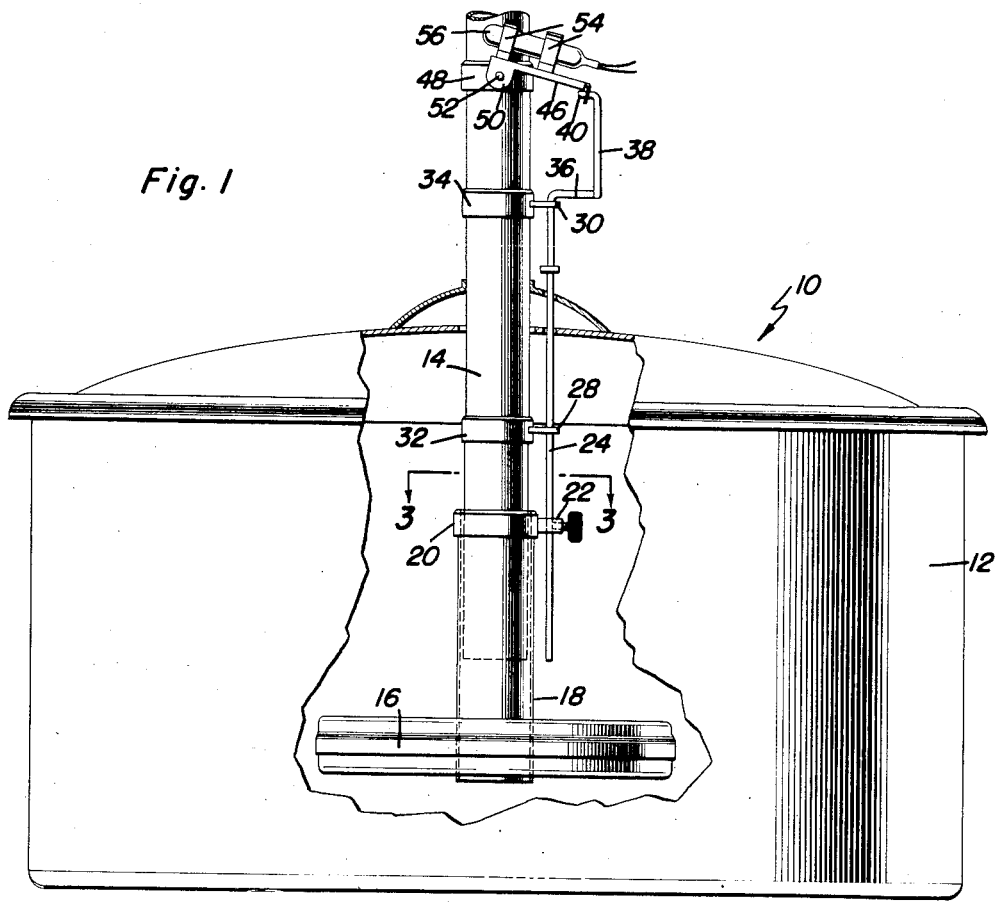
Figure 1 is an elevational view showing the control device comprising the present invention in operative installation relative to a milk bottle filler and with parts of the bottle filler being broken away to show the invention in greater detail.
Figure 2:
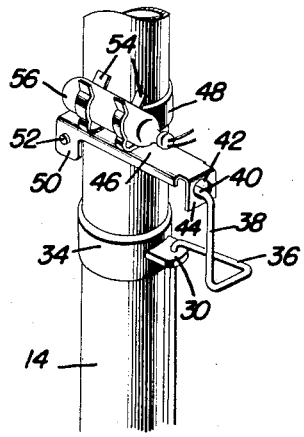
Figure 2 is a perspective view of the fluid conductor switch and mounting therefor which comprises one important element of the present invention.
Figure 3:
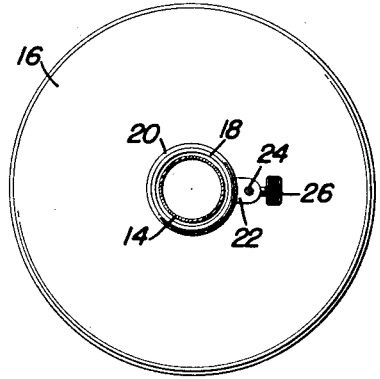
Figure 3 is a horizontal sectional view as taken along line 3—3 in Figure 1.

With continuing reference to the accompanying drawings, wherein like reference numerals designate similar parts throughout the various views, reference numeral 10 generally designates a milk bottle filler which comprises a tank 12 having a plurality of valves for filling milk bottles extending therefrom (not shown). Extending into the tank 12 is a conduit 14 which is connected to a pump for supplying the milk which is passed through a suitable cooler.

Slidably mounted on the conduit 14, which is preferably a stainless steel pipe, is a float which comprises a float body proper 16 and a tubular member 18, both the float and the tubular member being concentric with the conduit 14 and slidable relative thereto. At the other end of the tubular member 18 there is formed a collar 20 from which a lug 22 extends, which lug is provided with an aperture for receiving a connecting rod 24, the purpose of the connecting rod being henceforth explained. There is also provided a knurled screw 26 extending at right angles to the aperture in which the rod 24 is slidably emplaced so as to provide means for securing the rod relative to the lug 22 and hence relative to the float body 16.

The rod 24 extends upwardly through other lugs 28 and 30 which are attached to other collars 32 and 34 mounted on the conduit 14. After passing through the collar 30, the rod 24 is provided with a substantially L-shaped horizontal portion 36 for providing a vertical offset 38 so that the inwardly bent end 40 forming a substantially fixed portion could be engaged within an aperture 42 in a downwardly extending lug 44 of a bracket 46 which is pivotally mounted on a collar 48 secured to the conduit 14. The bracket 46 includes an ear 50 through which a rod 52 passes, which rod is secured to the collar 48 so as to provide means for pivotally mounting the bracket 46 relative to the collar. Clamps 54 are provided for holding a fluid conductor switch, such as a mercury switch 56, in position on the bracket. Upon actuation of the rod 24, the bracket 46 will be pivoted and the mercury switch will be tilted so that the pump may be started or stopped.

In operation, as the milk flows through the milk valves at the bottom of the tank 12 into the bottles to be filled, the level of the milk in the milk tank gradually drops, and as a result the float 16 gradually drops which turns on the switch 56 and which, in turn, starts the milk pump and permits milk to flow into the tank 12. When the milk is no longer being drawn from the bottler and the level of the milk in the milk tank rises, the float rises and automatically turns off the mercury switch 56, thus stopping the milk pump which controls the flow of milk.

Since, from the foregoing, the construction and advantages of this automatic milk level control for bottle filler is readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may readily be resorted to which fall within the scope of the appended claim.

Having described the invention, what is claimed as new is:

In combination with a tank, a fluid inlet conduit extending downwardly into said tank and having its discharge end terminating in vertical spaced relation to the bottom of said tank, a bracket pivotally mounted at one end on said conduit, a rod pivotally secured to the other end of said bracket, means slidably maintaining said rod in parallel relation to said conduit, a sleeve slidably disposed on said conduit and constituting an extensible discharge end for said conduit, means adjustably securing said sleeve on said rod, a float secured to the discharge end of said sleeve, a pump control switch mounted on said bracket, said rod operatively connecting said switch and said float whereby movement of the float will tilt the bracket to operate the switch.

References Cited in the file of this patent

UNITED STATES PATENTS

| Number | Name | Date |
|---|---|---|
| 1,252,343 | Grohnert | Jan. 1, 1918 |
| 1,582,857 | Peter | Apr. 27, 1926 |
| 1,734,586 | Larsen | Nov. 5, 1929 |
| 1,760,382 | Teesdale | May 27, 1930 |
| 1,883,266 | Yoder | Oct. 18, 1932 |
| 2,189,427 | Long | Feb. 6, 1940 |